(12) United States Patent
Fudemoto et al.

(10) Patent No.: US 9,623,702 B2
(45) Date of Patent: Apr. 18, 2017

(54) NON-PNEUMATIC TYRE

(71) Applicant: BRIDGESTONE CORPORATION, Tokyo (JP)

(72) Inventors: Hiroyuki Fudemoto, Yokohama (JP); Ryuji Izumoto, Tokyo (JP); Hidefumi Kotsubo, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 14 days.

(21) Appl. No.: 14/433,546

(22) PCT Filed: Dec. 9, 2013

(86) PCT No.: PCT/JP2013/082958
§ 371 (c)(1),
(2) Date: Apr. 3, 2015

(87) PCT Pub. No.: WO2014/103680
PCT Pub. Date: Jul. 3, 2014

(65) Prior Publication Data
US 2015/0273935 A1 Oct. 1, 2015

(30) Foreign Application Priority Data

Dec. 26, 2012 (JP) .................. 2012-282662

(51) Int. Cl.
*B60B 9/04* (2006.01)
*B60B 5/02* (2006.01)
(Continued)

(52) U.S. Cl.
CPC .................. *B60B 9/04* (2013.01); *B60B 5/02* (2013.01); *B60C 7/14* (2013.01); *B60C 7/24* (2013.01)

(58) Field of Classification Search
CPC .... B60C 7/10; B60C 7/12; B60C 7/14; B60C 7/18; B60C 2007/107; B60C 2007/146
See application file for complete search history.

(56) References Cited

U.S. PATENT DOCUMENTS 4,998,980 A 3/1991 Katou
2014/0251518 A1* 9/2014 Abe .................. B60B 9/04
152/75

FOREIGN PATENT DOCUMENTS

CN 101223042 A 7/2008
EP 0 353 006 A2 1/1990
(Continued)

OTHER PUBLICATIONS

International Standard, ISO 18064, "Thermoplastic elastomers—Nomenclature and abbreviated terms", First Edition, Sep. 1, 2003, 11 pgs.
(Continued)

*Primary Examiner* — John Walters
*Assistant Examiner* — James Triggs
(74) *Attorney, Agent, or Firm* — Sughrue Mion, PLLC

(57) ABSTRACT

A non-pneumatic tire includes an attachment body (11) attached to an axle, a ring member (14) including an inner rim (12) fitted onto the attachment body (11) and an outer rim (13) configured to surround the inner rim (12) from the outside in a tire radial direction, and a plurality of connecting members (15) disposed between the inner rim (12) and the outer rim (13) in a tire circumferential direction and configured to connect the rims (12) and (13) to each other, wherein at least a portion of the ring member (14) and the plurality of connecting members (15) are integrally formed of a synthetic resin material having a bending modulus of elasticity obtained through a 3-point bending test pursuant to ISO 178 of more than 300 MPa and a deflection temperature under a load at 0.455 MPa obtained pursuant to ASTM D648 of 62° C. or more.

7 Claims, 4 Drawing Sheets

(51) Int. Cl.
   *B60C 7/14*      (2006.01)
   *B60C 7/24*      (2006.01)

(56)         References Cited

FOREIGN PATENT DOCUMENTS

JP        2-182501 A      7/1990
JP     2009-286208 A     12/2009
JP     2011-156905 A      8/2011
JP      2012011973 A      1/2012
WO    2006/116807 A1    11/2006

OTHER PUBLICATIONS

International Search Report for PCT/JP2013/082958 dated Jan. 14, 2014.

* cited by examiner

NON-PNEUMATIC TYRE

TECHNICAL FIELD

The present invention relates to a non-pneumatic tire in which filling the tire with pressurized air before use is unnecessary.

Priority is claimed on Japanese Patent Application No. 2012-282662, filed Dec. 26, 2012, the content of which is incorporated herein by reference.

BACKGROUND ART

In a pneumatic tire of the related art that is filled with pressurized air and used, an occurring blowout is a structurally unavoidable problem.

In order to solve this problem, in recent years, for example, as disclosed in the following Patent Document 1, a non-pneumatic tire including an attachment body attached to an axle, a ring-shaped body configured to surround the attachment body from the outside in a tire radial direction, and a plurality of connecting members disposed between the attachment body and the ring-shaped body in a tire circumferential direction has been proposed.

DOCUMENT OF RELATED ART

Patent Document

[Patent Document 1] Japanese Unexamined Patent Application, First Publication No. 2011-156905

SUMMARY OF INVENTION

Technical Problem

However, in the non-pneumatic tire of the related art, upon assembly thereof, both end sections of each of a plurality of connecting members should be connected to the ring-shaped body and the attachment body, which not only increases manufacturing time, but also interferes with attempts to decrease weight. In addition, rapid rotation and repeated deformation of the non-pneumatic tire during travel of a vehicle should be investigated more.

In consideration of the above-mentioned circumstances, the present invention is directed to provide a non-pneumatic tire capable of easy assembly and suppression of an increase in weight.

Solution to Problem

A non-pneumatic tire of the present invention includes an attachment body attached to an axle; a ring member including an inner rim fitted onto the attachment body and an outer rim configured to surround the inner rim from the outside in a tire radial direction; and a plurality of connecting members disposed between the inner rim and the outer rim in a tire circumferential direction and configured to connect the rims to each other, wherein at least a portion of the ring member and the plurality of connecting members are integrally formed of a synthetic resin material having a bending modulus of elasticity obtained through a 3-point bending test pursuant to ISO 178 of more than 300 MPa and a deflection temperature under a load at 0.455 MPa obtained pursuant to ASTM D648 of 62° C. or more.

In the present invention, since at least the portion of the ring member and the plurality of connecting members are integrally formed, when the non-pneumatic tire is assembled, even if both end sections of the plurality of connecting members are not connected to the inner rim and the outer rim, it is sufficient if the case body formed by integrally forming at least the portion of the ring member and the plurality of connecting members is mounted on the attachment body, and thus manufacturing time can be reduced.

In addition, since at least the portion of the ring member and the plurality of connecting members are integrally formed, for example, an increase in weight can be suppressed in comparison with the case in which both end sections of the connecting members are connected to the inner rim and the outer rim using a fastening member or the like.

Further, since the bending modulus of elasticity of the synthetic resin material that integrally forms at least the portion of the ring member and the plurality of connecting members is set within the predetermined range, strength necessary and sufficient for the non-pneumatic tire can be reliably obtained.

In addition, when the bending modulus of elasticity of the synthetic resin material is 12000 MPa or less, comfortable ride characteristics can be provided.

Moreover, since the deflection temperature under the load of the synthetic resin material is set to the above-mentioned range, softening due to an external air temperature can be prevented. Further, when a vehicle on which the non-pneumatic tire is mounted travels, even if the non-pneumatic tire is rapidly rotated to be repeatedly deformed, it is possible to prevent a large deformation in which the tire cannot travel due to softening caused by heat.

Here, the connecting members may include first elastic connecting plates and second elastic connecting plates configured to connect the rims to each other, one end sections of the first elastic connecting plates connected to the outer rim may be disposed closer to one side in the tire circumferential direction than the other end sections connected to the inner rim, one end sections of the second elastic connecting plates connected to the outer rim may be disposed closer to the other side in the tire circumferential direction than the other end sections connected to the inner rim, the plurality of first elastic connecting plates may be disposed in the tire circumferential direction at positions in the tire width direction, and the plurality of second elastic connecting plates may be disposed in the tire circumferential direction at other positions in the tire width direction different from the positions in the tire width direction.

In this case, since the plurality of first elastic connecting plates are disposed in the tire circumferential direction at the positions in the tire width direction, and the plurality of second elastic connecting plates are disposed in the tire circumferential direction at the other positions in the tire width direction, interference between the connecting members neighboring in the tire circumferential direction can be suppressed, and a restriction on the number disposed can be suppressed.

In addition, since the one end sections of the first elastic connecting plates connected to the outer rim are disposed closer to one side in the tire circumferential direction than the other end sections connected to the inner rim and the one end sections of the second elastic connecting plates connected to the outer rim are disposed closer to the other side in the tire circumferential direction than the other end sections connected to the inner rim, when an external force is applied to the non-pneumatic tire, the first elastic connecting plates and the second elastic connecting plates can easily elastically deform, and comfortable ride characteristics can be obtained by providing flexibility in the non-pneumatic tire.

In addition, the ring member may be divided into one split ring member disposed at one side in the tire width direction and another split ring member disposed at the other side in the tire width direction, the one split ring member may be integrally formed with the first elastic connecting plates, and the other split ring member may be integrally formed with the second elastic connecting plates.

In this case, in the first split case body in which the one split ring member and the first elastic connecting plates are integrally formed and the second split case body in which the other split ring member and the second elastic connecting plates are integrally formed, only the plurality of first elastic connecting plates or the plurality of second elastic connecting plates extending in a certain direction are disposed between the outer rim and the inner rim when the tire is seen from the side view of the tire in the tire width direction, and the others extending in other directions are not disposed therebetween.

For this reason, when the ring member and the connecting members are formed, first, the first and second split case bodies that can be easily formed with a simple structure are formed. Accordingly, in comparison with the case in which the ring member and all of the connecting members are integrally formed to form the case body having a complex structure, the non-pneumatic tire can be easily and reliably formed.

Further, the one split ring member and the first elastic connecting plates, and the other split ring member and the second elastic connecting plates may be integrally formed through injection molding.

In this case, since the first split case body and the second split case body are integrally formed through injection molding, the non-pneumatic tire can be more easily formed.

Moreover, as described above, in each of the split case bodies, since only one of the groups of elastic connecting plates is disposed between the outer rim and the inner rim, when the split case bodies are integrally formed through injection molding, the molten resin can easily reach corners in a mold, a structure of the mold can be suppressed from becoming complicated, and the non-pneumatic tire can be more easily and reliably formed.

In addition, the one end sections of the first elastic connecting plate and the second elastic connecting plate of one of the connecting members may be disposed at different positions in the tire width direction and connected at the same position in the tire circumferential direction in an inner circumferential surface of the outer rim, and the connecting member may extend in the tire radial direction when the tire is seen from a side view of the tire in the tire width direction, and may be line-symmetrically formed with respect to an imaginary line passing through the one end sections.

In this case, since the connecting member is line-symmetrically formed with respect to the imaginary line when seen from the side view of the tire, an occurrence of a difference between a spring constant along one side in the tire circumferential direction of the non-pneumatic tire and a spring constant along the other side can be suppressed, and good controllability can be provided.

Effects of the Invention

According to the present invention, the non-pneumatic tire can be easily assembled, and an increase in weight thereof can be suppressed.

DESCRIPTION OF EMBODIMENTS

Figure 1:
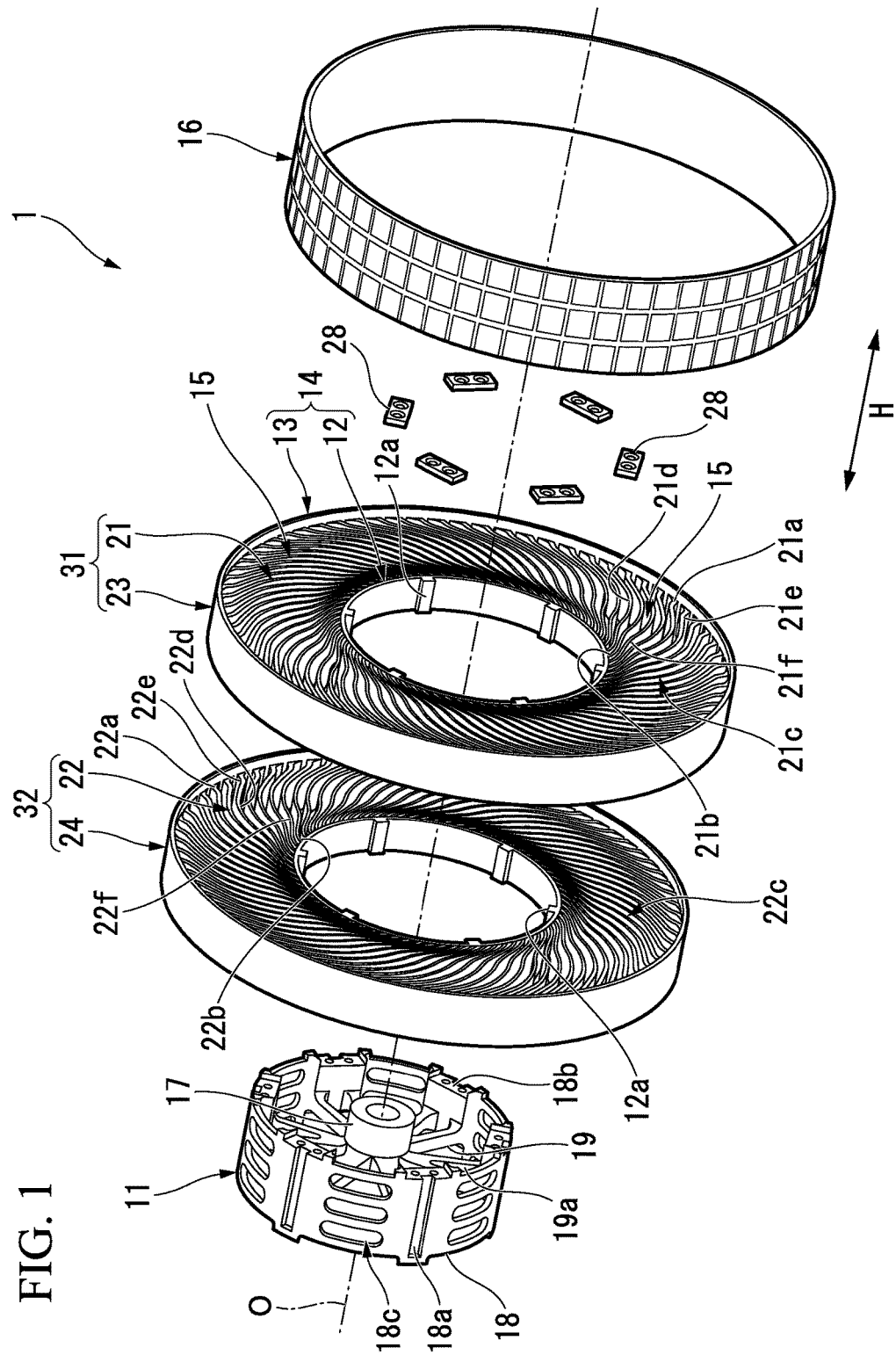
FIG. 1 is a partially exploded schematic perspective view of a non-pneumatic tire according to an embodiment of the present invention.

Hereinafter, an embodiment of a non-pneumatic tire according to the present invention will be described with reference to FIGS. 1 to 4.

A non-pneumatic tire 1 includes an attachment body 11 attached to an axle (not shown), a ring member 14 including an inner rim 12 fitted onto the attachment body 11 and an outer rim 13 configured to surround the inner rim 12 from the outside in a tire radial direction, a plurality of connecting members 15 disposed between the inner rim 12 and the outer rim 13 in a tire circumferential direction and configured to connect the rims 12 and 13 to each other in a relatively elastically displaceable manner, and a tread member 16 disposed at an outer circumferential surface side of the outer rim 13 throughout the entire circumference.

Here, the attachment body 11, the inner rim 12, the outer rim 13, and the tread member 16 are disposed coaxially on a common axis. Hereinafter, the common axis is referred to as an axis O, a direction along the axis O is referred to as a tire width direction H, a direction perpendicular to the axis O is referred to as a tire radial direction, and a direction around the axis O is referred to as a tire circumferential direction. Further, the attachment body 11, the inner rim 12, the outer rim 13, and the tread member 16 are disposed such that central sections in the tire width direction H coincide with each other.

In the ring member 14, the outer rim 13 has a larger size in the tire width direction H, i.e., a larger width, than the inner rim 12. In addition, a plurality of ridge sections 12a protruding inward in the tire radial direction and extending throughout the entire length in the tire width direction H are disposed at an inner circumferential surface of the inner rim 12 at intervals in the tire circumferential direction.

Figure 2:
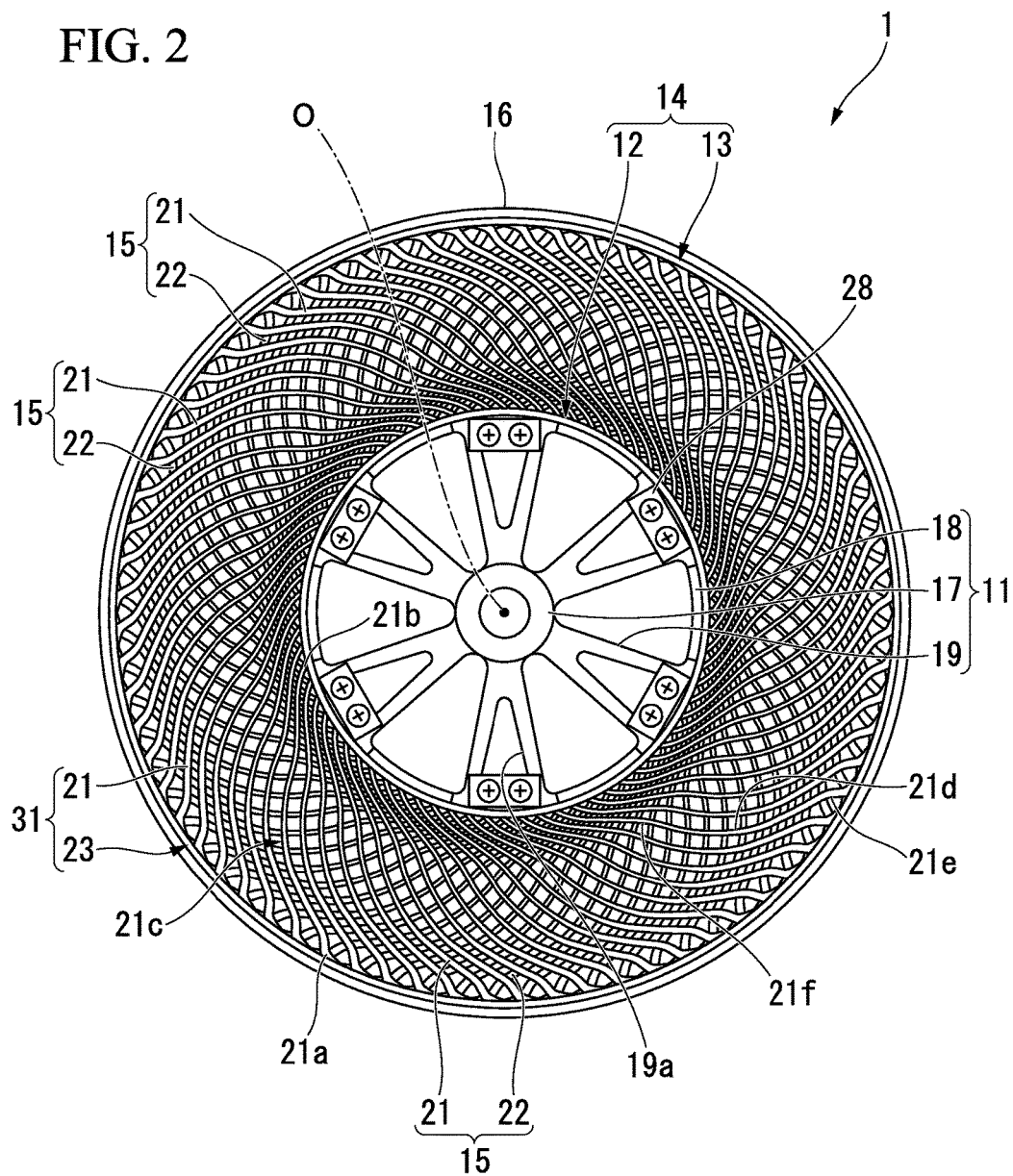
FIG. 2 is a side view of the non-pneumatic tire shown in FIG. 1 when seen from one side in a tire width direction.

As shown in FIGS. 1 and 2, the attachment body 11 includes a mounting cylindrical section 17 on which a front end section of the axle is mounted, an outer ring section 18 configured to surround the mounting cylindrical section 17 from the outside in the tire radial direction, and a plurality of ribs 19 configured to connect the mounting cylindrical section 17 and the outer ring section 18.

The mounting cylindrical section 17, the outer ring section 18, and the ribs 19 are integrally formed of a metal material such as an aluminum alloy or the like. The mounting cylindrical section 17 and the outer ring section 18 are formed in a cylindrical shape and disposed on the same axis as the axis O. The plurality of ribs 19 are disposed at equal intervals in the circumferential direction.

A plurality of key groove sections 18a concaved inward in the tire radial direction and extending in the tire width direction H are formed at an outer circumferential surface of the outer ring section 18 at intervals in the tire circumferential direction. In the outer circumferential surface of the outer ring section 18, the key groove sections 18a are open at only one side of both ends in the tire width direction H and closed at the other side. The ridge sections 12a of the inner rim 12 in the ring member 14 are fitted into the key groove sections 18a.

Further, in wall surfaces configured to form the key groove sections 18a, a pair of side wall surfaces opposite to each other in the tire circumferential direction are perpendicular to a bottom wall surface. In addition, in outer surfaces of the ridge sections 12a, a pair of side wall surfaces protruding upward from the inner circumferential surface of the inner rim 12 are perpendicular to a top wall surface facing inward in the tire radial direction. Sizes in the tire circumferential direction of the ridge sections 12a and the key groove sections 18a are equal to each other.

Here, in an edge of one side in the tire width direction H of the outer ring section 18, concave sections 18b concaved toward the other side in the tire width direction H and into which plate members 28 are fitted are formed at positions corresponding to the key groove sections 18a. Through-holes are formed in the plate members 28, and in the wall surfaces that form the concave sections 18b, female screw sections in communication with the through-holes of the plate members 28 fitted into the concave sections 18b are formed in the wall surface facing the one side in the tire width direction H. Further, the plurality of female screw sections and the plurality of through-holes are formed at intervals in the tire circumferential direction.

Then, the ring member 14 is fixed to the attachment body 11 by bolts threaded into the female screw sections through the through-holes of the plate members 28 fitted into the concave sections 18b in a state in which the inner rim 12 is fitted onto the attachment body 11 from the outside and the ridge sections 12a are fitted into the key groove sections 18a. In this state, the ridge sections 12a are interposed between the plate members 28 and the other end wall surfaces of the wall surfaces forming the concave sections 18b disposed at the other end in the tire width direction H and facing the one side in the tire width direction H.

Further, a plurality of hole arrays 18c, in each of which a plurality of weight-reducing holes passing in the tire radial direction are disposed at intervals in the tire width direction H, are formed at a portion of the outer ring section 18 disposed between the key groove sections 18a neighboring in the tire circumferential direction at intervals in the tire circumferential direction. In addition, weight-reducing holes 19a passing in the tire width direction H are also formed in the ribs 19.

The tread member 16 is formed in a cylindrical shape, and integrally covers the outer circumferential surface side of the outer rim 13 of the ring member 14 throughout the entire region. The tread member 16 is formed of, for example, natural rubber and/or vulcanized rubber in which a rubber composition is vulcanized, a thermoplastic material, or the like. For example, a thermoplastic elastomer, a thermoplastic resin, or the like is provided as the thermoplastic material. For example, an amide-based thermoplastic elastomer (TPA), an ester-based thermoplastic elastomer (TPC), an olefin-based thermoplastic elastomer (TPO), a styrene-based thermoplastic elastomer (TPS), a urethane-based thermoplastic elastomer (TPU), a thermoplastic rubber cross-linked body (TPV), or another thermoplastic elastomer (TPZ) or the like, defined by Japanese Industrial Standard JIS K6418, is provided as the thermoplastic elastomer. For example, a urethane resin, an olefin resin, a polyvinyl chloride resin, a polyamide resin, or the like, is provided as the thermoplastic resin. Further, in view of an abrasion resistance property, the tread member 16 may be formed of the vulcanized rubber.

The connecting members 15 include first elastic connecting plates 21 and second elastic connecting plates 22 configured to connect the inner rim 12 and the outer rim 13 of the ring member 14.

The plurality of (in the example shown, 60) connecting members 15 are installed in the tire circumferential direction such that the plurality of first elastic connecting plates 21 are disposed in the tire circumferential direction at predetermined positions in the tire width direction H, and the plurality of second elastic connecting plates 22 are disposed in the tire circumferential direction at other positions in the tire width direction H different from the predetermined positions in the tire width direction H.

That is, the plurality of first elastic connecting plates 21 are disposed in the tire circumferential direction at the same positions as in the tire width direction H, and the plurality of second elastic connecting plates 22 are disposed in the tire circumferential direction at predetermined positions in the same tire width direction H spaced apart from the first elastic connecting plates 21 in the tire width direction H.

Further, the plurality of connecting members 15 are disposed at positions rotationally symmetrical with respect to the axis O between the inner rim 12 and the outer rim 13 of the ring member 14. In addition, all of the connecting members 15 have the same shape and the same size. Further, widths of the connecting members 15 are smaller than a width of the outer rim 13.

Then, the first elastic connecting plates 21 neighboring in the tire circumferential direction do not come in contact with each other, and the second elastic connecting plates 22 neighboring in the tire circumferential direction do not come in contact with each other either. Further, the first elastic connecting plates 21 and the second elastic connecting plates 22 neighboring in the tire width direction H do not come in contact with each other either.

Further, the first elastic connecting plates 21 and the second elastic connecting plates 22 have the same widths. In addition, the first elastic connecting plates 21 and the second elastic connecting plates 22 also have the same thicknesses.

Here, in the first elastic connecting plates 21, one end sections 21a connected to the outer rim 13 are disposed closer to one side in the tire circumferential direction than other end sections 21b connected to the inner rim 12, and in the second elastic connecting plates 22, one end sections 22a connected to the outer rim 13 are disposed closer to the other side in the tire circumferential direction than the other end sections 22b connected to the inner rim 12.

In addition, the one end sections 21a and 22a of the first elastic connecting plates 21 and the second elastic connecting plates 22 of the connecting members 15 are disposed at different positions in the tire width direction H and connected at the same positions in the tire circumferential direction in the inner circumferential surface of the outer rim 13.

In the example shown, in the first elastic connecting plates 21 and the second elastic connecting plates 22, a plurality of curved sections 21d to 21f and 22d to 22f curved in the tire circumferential direction are formed at intermediate portions 21c and 22c disposed between the one end sections 21a and 22a and the other end sections 21b and 22b in a direction in which the connecting plates 21 and 22 extend when the tire 1 is seen from the tire width direction H in a side view of the tire. In the plurality of curved sections 21d to 21f and 22d to 22f of all of the connecting plates 21 and 22, curve directions of the curved sections 21d to 21f and 22d to 22f neighboring in the above-mentioned extending direction are opposite to each other.

The plurality of curved sections 21d to 21f formed in the first elastic connecting plates 21 have the first curved sections 21d curved to protrude toward the other side in the tire circumferential direction, the second curved sections 21e disposed between the first curved sections 21d and the one end sections 21a and curved to protrude toward the one side in the tire circumferential direction, and the third curved sections 21f disposed between the first curved sections 21d and the other end sections 21b and curved to protrude toward the one side in the tire circumferential direction.

The plurality of curved sections 22d to 22f formed in the second elastic connecting plates 22 have the first curved sections 22d curved to protrude toward the one side in the tire circumferential direction, the second curved sections 22e disposed between the first curved sections 22d and the one end sections 22a and curved to protrude toward the other side in the tire circumferential direction, and the third curved sections 22f disposed between the first curved sections 22d and the other end sections 22b and curved to protrude toward the other side in the tire circumferential direction.

In the example shown, the first curved sections 21d and 22d have larger radii of curvature when seen from the side view of the tire than the second curved sections 21e and 22e and the third curved sections 21f and 22f. Further, the first curved sections 21d and 22d are disposed at a central section in the extending direction of the first elastic connecting plates 21 and the second elastic connecting plates 22.

Figure 4:
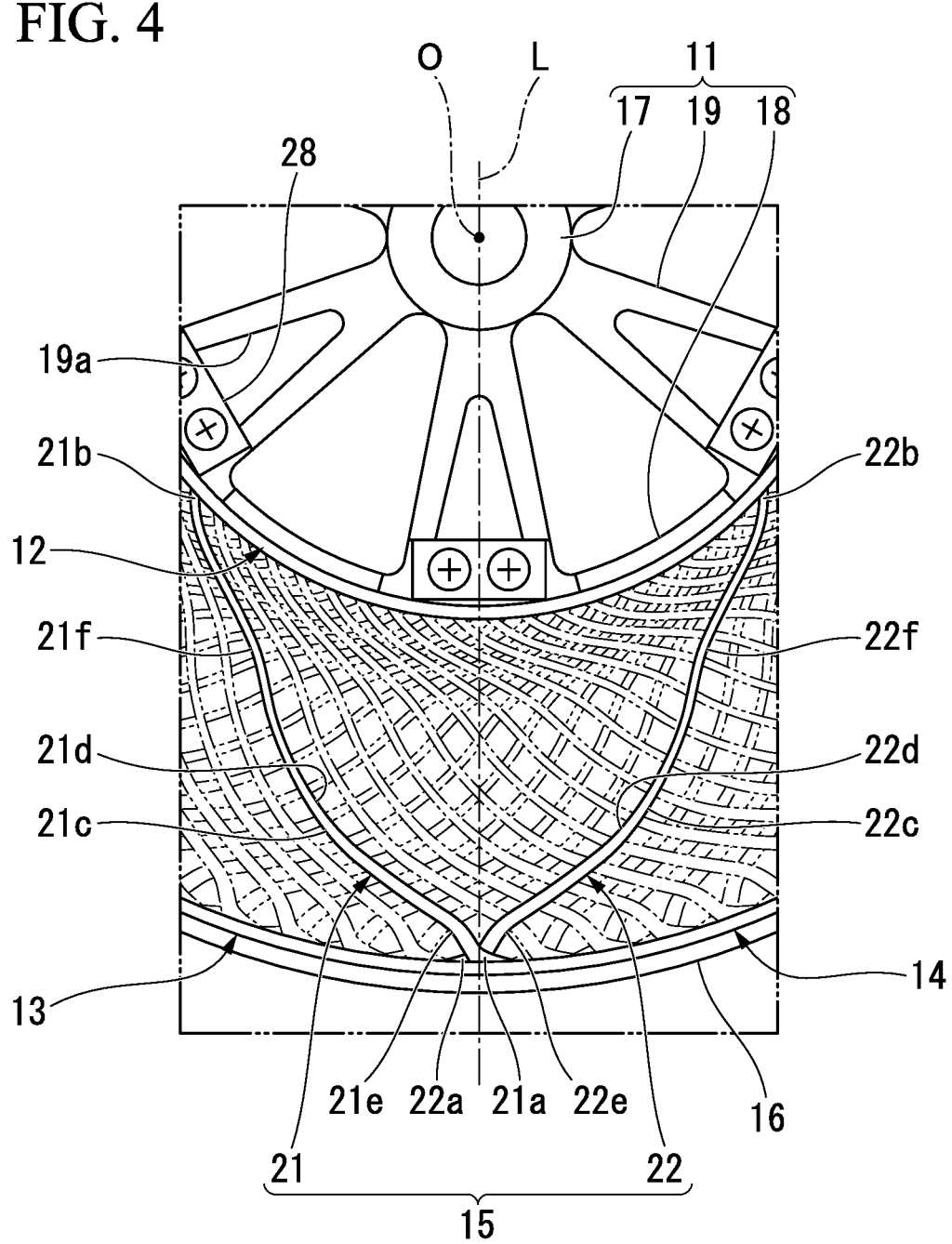
FIG. 4 is an enlarged view showing a major portion of FIG. 2.

Further, the lengths of all of the elastic connecting plates 21 and 22 are equal to one another, and, as shown in FIG. 4, the other end sections 21b and 22b of all of the elastic connecting plates 21 and 22 are connected to positions spaced the same angle (for example, 20° or more to 135° or less) from positions in the outer circumferential surface of the inner rim 12 opposite to the one end sections 21a and 22a in the tire radial direction at one side and the other side in the tire circumferential direction about the axis O when seen from the side view of the tire. In addition, the first curved sections 21d and 22d, the second curved sections 21e and 22e, and the third curved sections 21f and 22f of the first elastic connecting plates 21 and the second elastic connecting plates 22 protrude to face each other in the tire circumferential direction and have the same sizes.

Accordingly, as shown in FIG. 4, shapes of the connecting members 15 when seen from the side view of the tire extend in the tire radial direction and are linearly symmetrical with respect to an imaginary line L passing through the one end sections 21a and 22a of all of the connecting plates 21 and 22.

In addition, in all of the elastic connecting plates 21 and 22, one end side portions extending from the central section to the one end sections 21a and 22a in the above-mentioned extending direction have larger thicknesses than the other end side portions extending from the central section to the other end sections 21b and 22b. Accordingly, the strength of the one end side portions to which a large load in the first and second elastic connecting plates 21 and 22 is easily applied can be increased while suppressing an increase in weight of the connecting members 15 and securing flexibility of the connecting members 15. Further, the one end side portions smoothly continue to the other end side portions with no step difference.

Then, in the embodiment, the ring member 14 and the plurality of connecting members 15 are integrally formed of a synthetic resin material. A bending modulus of elasticity of the synthetic resin material obtained through a 3-point bending test pursuant to ISO 178 is more than 300 MPa, and a deflection temperature under a load at 0.455 MPa obtained pursuant to ASTM D648 is 62° C. or more. In addition, the bending modulus of elasticity of the synthetic resin material is 12000 MPa or less. Further, the synthetic resin material may be only one type of resin material, a mixture including two or more types of resin materials, or a mixture including one or more types of resin material and one or more types of elastomers, and further, for example, may include additives such as an antioxidant, a plasticizer, a filler, a pigment, or the like.

As the bending modulus of elasticity is 300 MPa or more, durability with respect to bending required as a tire material can be provided, and as a deflection temperature under a load at 0.455 MPa is 62° C. or more, durability with respect to heat generation by repeated deformation when used as the tire can also be maintained.

Here, the condition that the above-mentioned deflection temperature under the load of the synthetic resin material is 62° C. or more includes the condition in which the above-mentioned deflection temperature under the load is not measured within a temperature range of 160° C. or less. Further, the synthetic resin material exhibits the same effect even when the deflection temperature under the load at 1.82 MPa obtained pursuant to ASTM D648 is 60° C. or more. Further, while a test direction when the above-mentioned deflection temperature under the load is measured is flatwise, the test direction may be edgewise.

Further, in the embodiment, as shown in FIG. 1, the ring member 14 is divided into one split ring member 23 disposed at one side in the tire width direction H and the other split ring member 24 disposed at the other side in the tire width direction H. Further, in the example shown, the ring member 14 is divided at a central section in the tire width direction H.

Then, the one split ring member 23 is integrally formed with the first elastic connecting plates 21, and the other split ring member 24 is integrally formed with the second elastic connecting plates 22.

Further, in the embodiment, the one split ring member 23 and the first elastic connecting plates 21, and the other split ring member 24 and the second elastic connecting plates 22 are integrally formed through injection molding.

Hereinafter, a member obtained by integrally forming the one split ring member 23 and the first elastic connecting plates 21 is referred to as a first split case body 31, and a member obtained by integrally forming the other split ring member 24 and the second elastic connecting plates 22 is referred to as a second split case body 32.

Here, the injection molding may be a general method of simultaneously forming both of the entire first and second split case bodies 31 and 32, and in the first and second split case bodies 31 and 32, one of the one and the other split ring members 23 and 24 and the first and second elastic connecting plates 21 and 22 may be an insert product, and the other may be an insert molding product formed through injection molding, so-called two color formation, or the like.

In addition, in the first and second split case bodies 31 and 32, the one and the other split ring members 23 and 24 and the first and second elastic connecting plates 21 and 22 may be formed of different materials, or may be formed of the same material.

Further, when both of the entire first and second split case bodies 31 and 32 are simultaneously injection-molded, the plurality of ridge sections 12a formed at the inner rim 12 may be a gate portion.

In the first and second split case bodies 31 and 32, a central section in the tire width direction H of the first and second elastic connecting plates 21 and 22, a central section in the tire width direction H of the outer rim 13, and a central section in the tire width direction H of the inner rim 12 coincide with each other, and the inner rim 12 has a smaller width than the outer rim 13, and has the same width as the first elastic connecting plates 21 and the second elastic connecting plates 22.

Then, edges in the tire width direction H of the outer rim 13 of the one split ring member 23 and the outer rim 13 of the other split ring member 24 are connected by, for example, welding, fusion, adhesion, or the like. Further, among these, in the case of the welding, for example, hot plate welding or the like may be employed.

In addition, edges in the tire width direction H of the inner rim 12 of the one split ring member 23 and the inner rim 12 of the other split ring member 24 are separated from each other in the tire width direction H. Accordingly, generation of burrs on the inner circumferential surface of the inner rim 12 fitted onto the attachment body 11 from the outside is prevented.

Figure 3:
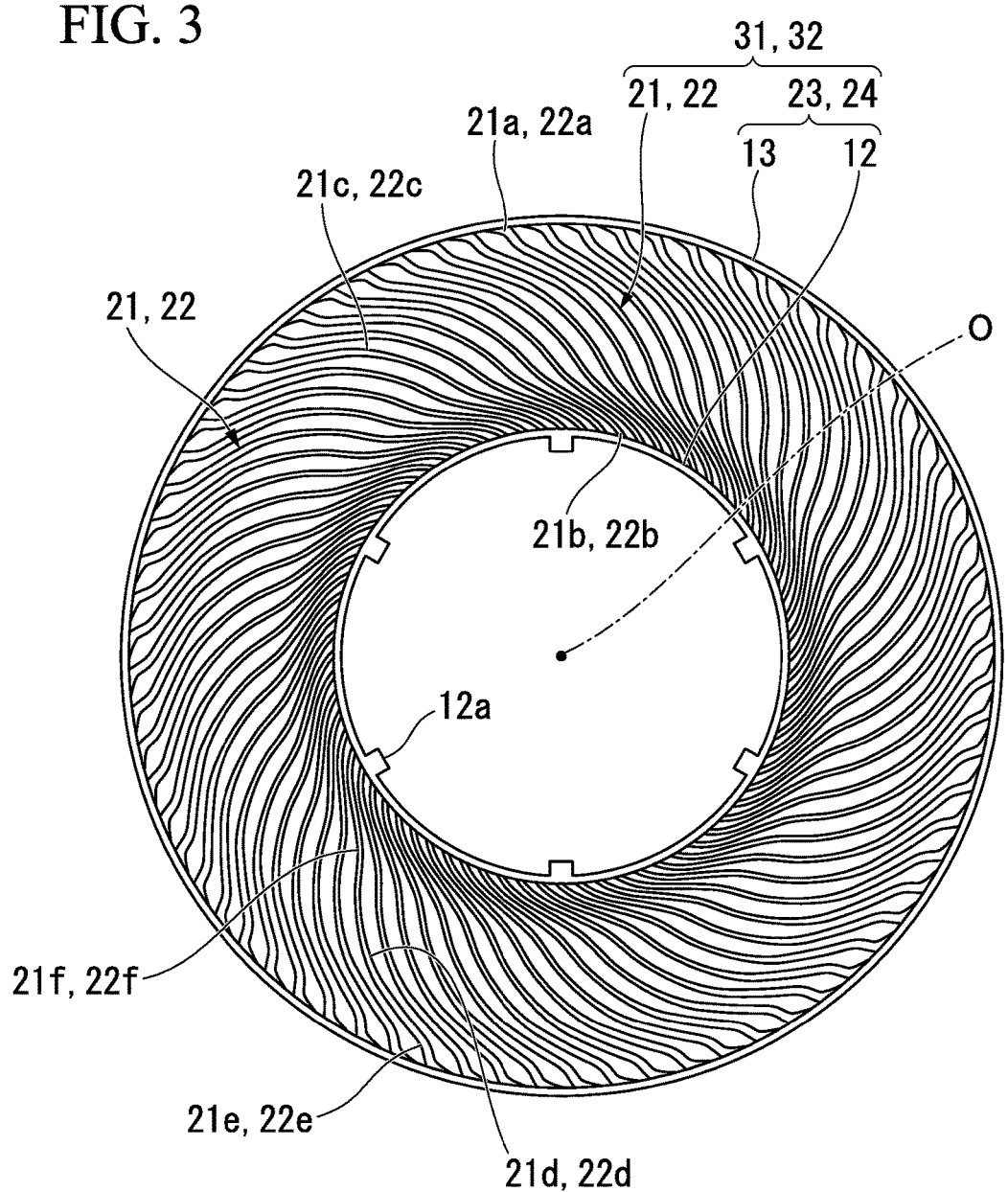
FIG. 3 is a plan view of a first split case body of the non-pneumatic tire shown in FIG. 1, in which a split ring member of one side and a first elastic connecting plate are integrally formed, when seen from one side in the tire width direction, or a plan view of a second split case body in which a split ring member of the other side and a second elastic connecting plate are integrally formed, when seen from the other side in the tire width direction.

In addition, the first split case body 31 and the second split case body 32 have the same shape and the same size as shown in FIG. 3 in a state before the bodies 31 and 32 are connected as described above.

Then, when connected as described above, the non-pneumatic tire 1 is obtained as the edges in the tire width direction H of the outer rims 13 of the first split case body 31 and the second split case body 32 match to be connected to each other in a state in which directions in the tire width direction H of both of the split case bodies 31 and 32 are opposite to each other while matching the positions in the tire circumferential direction of the first split case body 31 and the second split case body 32, such that the connecting members 15 are line-symmetrical to each other as described above when seen from the side view of the tire.

As described above, since the non-pneumatic tire 1 according to the embodiment includes the first split case body 31 in which the one split ring member 23 and the first elastic connecting plates 21 are integrally formed, and the second split case body 32 in which the other split ring member 24 and the second elastic connecting plates 22 are integrally formed, when the non-pneumatic tire 1 is assembled, even if the end sections 21a, 22a, 21b and 22b of the plurality of connecting members 15 are not respectively connected to the inner rim 12 and the outer rim 13, since it is sufficient that the first and second split case bodies 31 and 32 are mounted on the attachment body 11, manufacturing time can be reduced.

In addition, since the first and second split case bodies 31 and 32 are provided, for example, an increase in weight can be suppressed in comparison with the case in which all of the end sections 21a, 22a, 21b and 22b of the connecting member 15 are connected to the inner rim 12 and the outer rim 13 using a fastening member or the like.

In particular, since the bending modulus of elasticity of the synthetic resin material that integrally forms the ring member 14 and the plurality of connecting members 15 is set within a predetermined range, strength necessary and sufficient for the non-pneumatic tire 1 can be reliably provided.

In addition, when the bending modulus of elasticity of the synthetic resin material is 12000 MPa or less, comfortable ride characteristics can be provided.

Moreover, since the above-mentioned deflection temperature under the load of the synthetic resin material is set within the above-mentioned range, softening of the synthetic resin material due to a temperature of an external air can be prevented. Further, during traveling of the vehicle on which the non-pneumatic tire 1 is mounted, even when the non-pneumatic tire 1 is rapidly rotated to be repeatedly deformed, it is possible to prevent a large deformation in which the tire cannot travel due to softening caused by heat.

Further, since the plurality of first elastic connecting plates 21 are disposed in the tire circumferential direction at positions in the tire width direction H and the plurality of second elastic connecting plates 22 are disposed in the tire circumferential direction at other positions in the tire width direction H, interference between the connecting members 15 neighboring in the tire circumferential direction can be suppressed, and a restriction on the number disposed can be suppressed.

In addition, the one end sections 21a of the first elastic connecting plates 21 connected to the outer rim 13 are disposed closer to one side in the tire circumferential direction than the other end sections 21b connected to the inner rim 12, and the one end sections 22a of the second elastic connecting plates 22 connected to the outer rim 13 are disposed closer to the other side in the tire circumferential direction than the other end sections 22b connected to the inner rim 12. For this reason, when an external force is applied to the non-pneumatic tire 1, the first elastic connecting plate 21 and the second elastic connecting plate 22 can be easily elastically deformed, and thus, flexibility can be provided to the non-pneumatic tire 1 to secure comfortable ride characteristics.

Further, in the first split case body 31 and the second split case body 32, either the plurality of first elastic connecting plates 21 or the plurality of second elastic connecting plates 22 which extend in a certain direction are disposed in plural between the outer rim 13 and the inner rim 12 when seen from the side view of the tire, and the others which extend in another direction are not disposed therebetween. For this reason, when the ring member 14 and the connecting members 15 are formed, first, by forming the first and second split case bodies 31 and 32 having structures that can be simply and easily formed, all of the ring member 14 and the connecting members 15 can be integrally formed. Accordingly, in comparison with the case in which the case body having a complex structure is formed, the non-pneumatic tire 1 can be easily and reliably formed.

In addition, since the first and second split case bodies 31 and 32 are integrally formed through injection molding, the non-pneumatic tire 1 can be more easily formed.

Moreover, as described above, in the split case bodies 31 and 32, only one of the groups of elastic connecting plates 21 and 22 is disposed between the outer rim 13 and the inner rim 12. Accordingly, when the split case bodies 31 and 32 are integrally formed through injection molding, a molten resin can easily and reliably reach corners in the mold, and the structure of the mold can be suppressed from becoming complicated. Accordingly, the non-pneumatic tire 1 can be more easily and reliably formed.

In addition, since the connecting members 15 are line-symmetrically formed with respect to the imaginary line L when seen from the side view of the tire, an occurrence of a difference between a spring constant along one side in the tire circumferential direction of the non-pneumatic tire 1 and a spring constant along the other side can be suppressed, and good controllability can be provided.

Further, the technical spirit of the present invention is not limited to the embodiment but various modifications may be made without departing from the spirit of the present invention.

For example, curve directions of the curved sections 21d to 21f in the first elastic connecting plates 21 and curve directions of the curved sections 22d to 22f in the second elastic connecting plates 22 are not limited to the embodiment but may be appropriately varied.

In addition, in the embodiment, while a configuration in which one of the first elastic connecting plates 21 and the second elastic connecting plates 22 are provided as the connecting members 15 is shown, instead of this, a configuration in which both a plurality of the first elastic connecting plates 21 and a plurality of the second elastic connecting plates 22 are provided as one of the connecting members 15 at different positions in the tire width direction H may be employed.

In addition, the plurality of connecting members 15 may be disposed in the tire width direction H between the inner rim 12 and the outer rim 13.

In addition, unlike the embodiment, for example, the other end sections 21b and 22b of the first elastic connecting plates 21 and the second elastic connecting plates 22 may be connected at opposite positions of the outer circumferential surface of the inner rim 12 with the axis O interposed therebetween in the tire radial direction. Alternatively, in the outer circumferential surface of the inner rim 12, they may be connected to the one end sections 21a and 22a of the first elastic connecting plate 21 and the second elastic connecting plate 22 at opposite positions or the like in the tire radial direction.

In addition, unlike the embodiment, the one end sections 21a and 22a of all of the connecting plates 21 and 22 may be connected to the inner circumferential surface of the outer rim 13 at different positions in the tire circumferential direction.

Further, a gap in the tire width direction H may not be provided between the inner rim 12 of the one split ring member 23 and the inner rim 12 of the other split ring member 24.

In addition, the ring member 14 may be divided into three portions or more in the tire width direction H, or may not be divided.

Further, only the inner rim 12 of the ring member 14 and the connecting members 15 may be integrally formed of the synthetic resin material, or only the outer rim 13 of the ring member 14 and the connecting members 15 may be integrally formed of the synthetic resin material.

Moreover, the components of the above-mentioned embodiment may be appropriately substituted with known components or the above-mentioned variants may be appropriately combined without departing from the spirit of the present invention.

Next, a verification test with respect to the above-mentioned effects was performed.

As an example, as shown in Table 1, eight types of non-pneumatic tires 1 in which the ring member 14 and the plurality of connecting members 15 were integrally formed of the synthetic resin material having the bending modulus of elasticity of more than 300 MPa and the above-mentioned deflection temperature under the load at 0.455 MPa of 62° C. or more were formed. As comparative examples, as shown in Table 2, three types of non-pneumatic tires in which the ring member and the plurality of connecting members were integrally formed of the synthetic resin material having the bending modulus of elasticity of 300 MPa or less and the deflection temperature under the load at 0.455 MPa of 62° C. were formed.

Then, with respect to the eleven types of non-pneumatic tires, under an atmospheric temperature of 23° C. or under an atmospheric temperature of 40° C., the tires were checked for damage when a compressive force of 3000 kN was applied in the tire radial direction and damage when the tires were compressively deformed by 20 mm in the tire radial direction.

As a result, it was confirmed that, under both of the atmospheric temperatures of 23° C. and 40° C., none of the non-pneumatic tires of the examples were damaged, and among the non-pneumatic tires of the comparative example, under the atmosphere temperature of 40° C., all of the tires were damaged. In addition, it was confirmed that, under the atmospheric temperature of 23° C., the non-pneumatic tire having a bending modulus of elasticity of 300 MPa was not damaged, and the non-pneumatic tires having a bending modulus of elasticity of less than 300 MPa were damaged

TABLE 1

| | Examples | | | | | | | |
| --- | --- | --- | --- | --- | --- | --- | --- | --- |
| | 1 | 2 | 3 | 4 | 5 | 6 | 7 | 8 |
| Type of resin | N12 | N66 | N6 | PP | PBT | ABS | PPS | PEEK |
| Maker | Ube Industries | Unitika Ltd. | Ube Industries | Prime Polymer Co., Ltd. | WinTech Polymer Ltd. | Toray Industries | Polyplastic Ltd. | Victrex plc. |
| Grade | 3024U | A125J | 1013B | J705UG | 2002 | 300 | 0220A9 | 151G |
| Bending modulus of elasticity (MPa) | 1000 | 1100 | 750 | 1500 | 2630 | 1800 | 3800 | 4300 |
| Deflection temperature under load at 0.455 MPa (° C.) | 75 | 155 | / | 105 | / | / | / | / |
| Deflection temperature under load at 1.82 MPa (° C.) | / | / | 65 | / | 70 | 80 | 100 | 155 |
| Tire estimation (room temperature of 23° C.) | ○ | ○ | ○ | ○ | ○ | ○ | ○ | ○ |
| Tire estimation (40° C.) | ○ | ○ | ○ | ○ | ○ | ○ | ○ | ○ |

TABLE 2

| | Comparative examples | | |
|---|---|---|---|
| | 1 | 2 | 3 |
| Type of resin | TPO | TPAE | TPAE |
| Maker | Prime Polymer Co., Ltd. | Ube Industries | Ube Industries |
| Grade | F-3740 | XPA9048 | XPA9055 |
| Bending modulus of elasticity (MPa) | 240 | 180 | 300 |
| Deflection temperature under load at 0.455 MPa (° C.) | 45.2 | 51.5 | 62 |
| Deflection temperature under load at 1.82 MPa (° C.) | / | / | / |
| Tire estimation (room temperature of 23° C.) | X | X | ○ |
| Tire estimation (40° C.) | X | X | X |

INDUSTRIAL APPLICABILITY

Assembly can be easily performed, and an increase in weight can be suppressed.

DESCRIPTION OF REFERENCE SIGNS 1 non-pneumatic tire
11 attachment body
12 inner rim
13 outer rim
14 ring member
15 connecting member
21 first elastic connecting plate
22 second elastic connecting plate
21a, 22a one end section
21b, 22b other end section
23 one split ring member
24 other split ring member
H tire width direction
L imaginary line
O axis

The invention claimed is:

1. A non-pneumatic tire comprising:
an attachment body attached to an axle;
a ring member including an inner rim fitted onto the attachment body and an outer rim configured to surround the inner rim from the outside in a tire radial direction; and
a plurality of connecting members disposed between the inner rim and the outer rim in a tire circumferential direction and configured to connect the rims to each other,
wherein at least a portion of the ring member and the plurality of connecting members are integrally formed of a synthetic resin material having a bending modulus of elasticity obtained through a 3-point bending test pursuant to ISO 178 (2010) of more than 300 MPa and a deflection temperature under a load at 0.455 MPa obtained pursuant to ASTM D648 (2004) of 62° C. or more.

2. The non-pneumatic tire according to claim 1, wherein the connecting members comprise first elastic connecting plates and second elastic connecting plates configured to connect the rims to each other,
one end sections of the first elastic connecting plates connected to the outer rim are disposed closer to one side in the tire circumferential direction than the other end sections connected to the inner rim,
one end sections of the second elastic connecting plates connected to the outer rim are disposed closer to the other side in the tire circumferential direction than the other end sections connected to the inner rim, and
the plurality of first elastic connecting plates are disposed in the tire circumferential direction at positions in the tire width direction, and the plurality of second elastic connecting plates are disposed in the tire circumferential direction at other positions in the tire width direction different from the positions in the tire width direction.

3. The non-pneumatic tire according to claim 2, wherein the ring member is divided into one split ring member disposed at one side in the tire width direction and the other split ring member disposed at the other side in the tire width direction,
the one split ring member is integrally formed with the first elastic connecting plates, and
the other split ring member is integrally formed with the second elastic connecting plates.

4. The non-pneumatic tire according to claim 3, wherein the one split ring member and the first elastic connecting plates, and the other split ring member and the second elastic connecting plates are integrally formed through injection molding.

5. The non-pneumatic tire according to claim 2, wherein the one end sections of the first elastic connecting plate and the second elastic connecting plate of one of the connecting members are disposed at different positions in the tire width direction and connected at the same position in the tire circumferential direction in an inner circumferential surface of the outer rim, and
the connecting member is line-symmetrically formed with respect to an imaginary line passing through each of the one end sections and extending in the tire radial direction when the tire is seen in a side view of the tire from the tire width direction.

6. The non-pneumatic tire according to claim 3, wherein the one end sections of the first elastic connecting plate and the second elastic connecting plate of one of the connecting members are disposed at different positions in the tire width direction and connected at the same position in the tire circumferential direction in an inner circumferential surface of the outer rim, and
the connecting member is line-symmetrically formed with respect to an imaginary line passing through each of the one end sections and extending in the tire radial direction when the tire is seen in a side view of the tire from the tire width direction.

7. The non-pneumatic tire according to claim 4, wherein the one end sections of the first elastic connecting plate and the second elastic connecting plate of one of the connecting members are disposed at different positions in the tire width direction and connected at the same position in the tire circumferential direction in an inner circumferential surface of the outer rim, and
the connecting member is line-symmetrically formed with respect to an imaginary line passing through each of the one end sections and extending in the tire radial direction when the tire is seen in a side view of the tire from the tire width direction.

* * * * *